United States Patent Office 3,349,059
Patented Oct. 24, 1967

3,349,059
COLOR STABILIZED POLY-α-OLEFIN
COMPOSITIONS
Gerald R. Lappin, Kingsport, Tenn., assignor to Eastman Kodak Company, Rochester, N.Y., a corporation of New Jersey
No Drawing. Continuation of application Ser. No. 127,105, July 27, 1961. This application Aug. 19, 1966, Ser. No. 573,725
12 Claims. (Cl. 260—45.85)

ABSTRACT OF THE DISCLOSURE

A stabilized plastic composition comprising a poly-α-olefin containing a trace amount of a metallic polymerization catalyst residue, a bisphenol antioxidant and a diethanolamine.

This application is a continuation of application Ser. No. 127,105, filed July 27, 1961, now abandoned.

This invention relates to plastic compositions. More particularly, it relates to poly-α-olefin compositions.

Poly-α-olefin polymers such as polyethylene and polypropylene undergo a photochemical degradation when exposed to sunlight, particularly ultraviolet light, and air. This effect is frequently termed weathering. It appears to be a photo-oxidation process which causes rupture of the polymer chains and formation of carbonyl groups. As it progresses, articles manufactured from these polymers tend to crack, become brittle and lose tensile strength to the extent of mechanical failure. Consequently, it is customary to add to poly-α-olefin polymers an additive which functions to retard or suppress this photo-oxidation effect. One type of additive commonly used functions to suppress photo-oxidation by absorbing ultraviolet light. Another type of additive generally incorporated into these polymers functions to retard photo-oxidation by inhibiting oxygen. For this reason this type of additive is referred to as an antioxidant. Some additives function by both ultraviolet light absorption and inhibition of oxygen. The problem which this invention solves concerns poly-α-olefin compositions containing an antioxidant type of additive.

Bisphenol type compounds are quite effective antioxidants relative to poly-α-olefin polymers. However, these polymers frequently contain at trace concentrations a metallic composition which appears to form a highly colored complex with bisphenol antioxidants. This metallic component, hereinafter referred to as a metallic color former, usually is the residue remaining in the polymer of the metallic, polymerization catalyst composition employed in the synthesis of the polymer. It has been found that when a bisphenol antioxidant is incorporated into a poly-α-olefin polymer containing at trace concentrations a metallic color former, the resulting plastic composition tends to develop a different color. In most cases this effect is undesirable and not wanted.

Hence, the problem which this invention solves is how to color stabilize poly-α-olefin compositions containing a metallic color former at trace concentrations and a bisphenol antioxidant.

An object of this invention is to provide a solution to this problem.

A specific object of this invention is to color stabilize with an additive poly-α-olefin plastic compositions containing a metallic color former at trace concentrations and a bisphenol antioxidant.

Another specific object of this invention is to provide such poly-α-olefin plastic compositions with a color stabilizer additive that is compatible with the polymer in that it does not exude therefrom.

These and other objects are achieved by this invention which is based on my discovery that certain diethanolamines suppress the development of color in poly-α-olefin compositions comprising a bisphenol antioxidant and a color former metallic component.

In summary, this invention broadly comprises a plastic composition consisting essentially of (1) a poly-α-olefin polymeric component containing a metallic color former at trace concentrations, (2) a bisphenol antioxidant component and (3) a diethanolamine of molecular weight in excess of about two hundred and compatible with said poly-α-olefin polymeric component.

The poly-α-olefin polymeric component of the generic composition of this invention comprises one or more high or low density, normally solid, homopolymers or copolymers of α-monoolefinic aliphatic hydrocarbons having 2–10 carbon atoms. Examples of such poly-α-olefin polymers are the homopolymers and copolymers of ethylene, propylene, butene-1, isobutylene, pentene-1, 2-methylbutene-1, 3-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1 and the like. Processes for preparing these polymers are well known and need not be described here in detail. Reference is made to the U.S. Patent, No. 2,912,424, of Cash and the U.S. Patent, No. 2,917,500, of Hagemeyer et al. for descriptions of typical catalytic processes for the preparation of homopolymers and copolymers of these poly-α-olefins. In general, the normally solid polymers of this invention are thermoplastic substances having average molecular weights of at least about nine thousand. In the average molecular weight range from about nine thousand to about twelve thousand the normally solid poly-α-olefin polmers generally are wax-like at room temperature while above an average molecular weight of about twelve thousand the normally solid poly-α-olefin polymers generally are wax-like at room temperature while above an average molecular weight of about twelve thousand these normally solid polymers have greater consistencies.

The metallic color former present in the poly-α-olefin polymeric component of this invention is usually, but not necessarily, metallic, polymerization catalyst residue. Metallic, polymerization catalysts commonly employed in the synthesis of poly-α-olefin polymers usually comprise one or more metals in free form or in chemically combined form. While many of the known metals in the Periodic Table have been suggested for use in α-olefin polymerization catalysts compositions, commonly employed metals include titanium, chromium and nickel. These three metals, at least, form colored complexes with bisphenol antoixidants in poly-α-olefin plastic compositions.

The concentration of the metallic color former in the polymeric component is usually small enough to be regarded as a trace concentration. In general the total metallic content of the poly-α-olefin polymeric component is less than about 0.1 weight percent of the polymeric component. For example, the titanium concentration in many poly-α-olefin polymers is of the order of 0.001 weight percent.

The bisphenol antixoidant component of the plastic composition of this invention comprises one or more bisphenol antioxidants. A common type of bisphenol antioxidant is that represented by the general formula

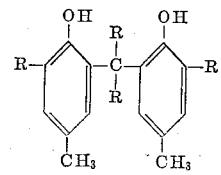

wherein each R is a radical independently selected from the group consisting of hydrogen and hydrocarbon radicals. Typical of this type of bisphenol antioxidants are 2,2' - methylene - bis(4 - methyl - 6 - tert. butylphenol) and 2,2' - methylene - bis[4 - methyl - 6 - (1 - methylcyclohexyl) - phenol]. A characteristic of the bisphenol antioxidant component of this invention is that the absence of admixture of the bisphenol antioxidant component with a poly-α-olefin polymeric component of this invention causes the resulting plastic composition to develop a different color.

Concentration of the bisphenol antioxidant component in the plastic composition can vary, depending on the degree of photo-oxidation stabilization desired. Generally, however, the concentration is about 0.1–1 percent by weight of the composition.

The diethanolamine additive of this invention is characterized by a molecular weight in excess of about two hundred and by being compatible with the poly-α-olefin component in that it does not exude therefrom after it is incorporated into the polymeric component. A preferred diethanolamine additive of this invention is one which is represented by the general formula:

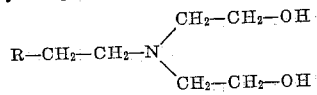

wherein R is a radical selected from the group consisting of (a) aliphatic hydrocarbon radicals having about 8–18 carbon atoms and (b) radicals of the formula

wherein R' is an aliphatic hydrocarbon radical having about 7–17 carbon atoms. Readily obtainable compounds of this formula (wherein R and R' are alkyl radicals) are N,N - bis(2-hydroxyethyl)-N-octylamine, N,N-bis(2-hydroxyethyl)-N-dodecylamine, N,N-bis(2-hydroxyethyl)-N-octadecylamine, the monocaproate ester of triethanolamine, the monolaurate ester of triethanolamine and the monostearate ester of triethanolamine. The diethanolamine additive functions to suppress the development of a different color in the plastic composition. Hence, in this plastic composition it is a color stabilizer. The basis for its function is believed to reside in its chelating properties. The color stabilizer of this invention is thought to have such an affinity for the metallic color former that upon making up the plastic composition from the poly-α-olefin polymeric component, the bisphenol antioxidant component and the color stabilizer, it effectively prevents the metallic color former from reacting with the bisphenol antioxidant to form the aforementioned, highly colored complex.

The concentration of the diethanolamine color stabilizer of this invention varies in general with the concentration of the metallic color former present in the poly-α-olefin polymeric component. However, an additive concentration in the plastic composition of about 0.01–0.5 weight percent is generally sufficient for good results.

The plastic compositions of this invention are prepared by incorporating the bisphenol antioxidant component and diethanolamine color stabilizer into the poly-α-olefin polymeric component. Generally such incorporation can be performed by anyone of a number of well-known methods, such as roll-compounding, extrusion, solvent-mixing, etc. For example, such incorporation can be performed by heating or otherwise softening the poly-α-olefin polymeric component to a workable consistency and then working in as by roll-compounding the bisphenol antioxidant component and diethanolamine color stabilizer of this invention until a substantially uniform mixture or dispersion is obtained. The resulting plastic compositions then are usually cast or molded into any desired shape, for example, such as pellets, sheeting, films, bars, filaments, articles and the like, as by conventional casting and molding techniques which include extrusion, blow molding and the like.

This invention is further illustrated by the following examples which include specific embodiments thereof. Unless otherwise indicated this invention is not limited to these specific embodiments.

EXAMPLE 1

Three samples of a batch of low density, normally solid polyethylene containing 0.005 weight percent of titanium as titanium tetrabutoxide were obtained. Incorporated into each sample to the extent of 0.1 weight percent was a bisphenol antioxidant marketed as Antioxidant 2246 and chemically identified as 2,2'-methylene-bis(4-methyl-6-tert. butylphenol). In one of the samples there was admixed to the extent of 0.05 weight percent N,N - bis(2-hydroxyethyl)-N-dodecylamine. In another sample there was incorporated to the extent of 0.05 weight percent the monolaurate ester of triethanolamine. The third sample contained no color stabilizer. Plates were pressed from the samples and subsequently the following color observations were made.

| Color stabilizer: | Color of plate |
|---|---|
| None | Yellow |
| N,N - bis(2-hydroxyethyl)-N-(n-dodecyl)-amine | Off-white |
| Triethanolamine monolaurate | White |

No exudation of color stabilizer from the plates was observed. Thus, the diethanolamines of this invention suppress color development in polyethylene compositions comprising a metallic color former and a bisphenol antioxidant.

EXAMPLE 2

A batch of high density normally solid polypropylene was obtained which comprised 0.03 weight percent metallic residue of unknown composition. Incorporated into three samples of this batch was a bisphenol antioxidant marketed as Nonox WSP and chemically identified as 2,2'-methylene-bis[4-methyl - 6 - (1-methylcyclohexyl)-phenol]. Concentration of the antioxidant in each sample was 0.1 weight percent. Incorporated into one sample to the extent of 0.05 weight percent was N,N-bis(2-hydroxyethyl)-N-dodecylamine. Incorporated into the second sample at a concentration of 0.05 weight percent was the monolaurate ester of triethanolamine. The third sample received no color stabilizer. Plates were pressed from each sample and subsequently color observations were made. These observations are set out in the following table.

| Color stabilizer: | Color of plate |
|---|---|
| None | Dark amber |
| N,N-bis(2-hydroxyethyl) - N - (n-dodecyl)-amine | Off-white |
| Monolaurate ester of triethanolamine | Cream |

No exudation of color stabilizer from the plates was observed. Thus, the diethanolamine additives of this example prevent the formation of color in, and are compatible with, polypropylene compositions comprising a metallic color former and the bisphenol antioxidant described.

EXAMPLE 3

Four samples of the polypropylene batch used in the tests of Example 2 were made up with each sample containing at a concentration of 0.1 weight percent the bisphenol antioxidant employed in Example 1, namely: 2,2'-methylene-bis(4-methyl-6-tert. butylphenol). Three of the samples contained at a concentration of 0.05 weight percent the diethanol color stabilizers of this invention, identified in the following table. The fourth sample contained no color stabilizer. Plates were pressed from each sample and subsequently the color of each plate was observed. The following table summarizes the color observations.

| Color stabilizer: | Color of plate |
|---|---|
| None | Orange-amber |
| N,N-bis(2-hydroxyethyl) - N - (n-octyl)-amine | Off-white |
| N,N-bis(2-hydroxyethyl) - N - (n-octadecyl)-amine | Off-white |
| Triethanolamine monostearate | Off-white |

No exudation or blooming of color stabilizer from the plates was observed. Consequently, the diethanolamine color stabilizers of this invention are effective in suppressing color development of polypropylene compositions containing a metallic color former and comprising the described bisphenol antioxidant.

Thus, there are provided poly-α-olefin polymer compositions containing metallic color formers and bisphenol antioxidants, which are established relative to color development. A feature of advantage is that the diethanolamine additives of this invention are compatible with poly-α-olefin polymers and do not exude therefrom.

Other features, advantages and embodiments of this invention will be apparent to those in ordinary skill in the art upon reading the foregoing disclosure. All embodiments of this invention including variations and modifications thereof which embrace the spirit and essential characteristics of this invention are within the scope of the claimed subject matter unless expressly excluded by claim language.

I claim:

1. A plastic composition comprising: (1) poly-α-olefin polymeric material prepared from α-monoolefinic aliphatic hydrocarbons having 2-10 carbon atoms, containing a metallic polymerization catalyst residue at trace concentration, (2) a bisphenol antioxidant having the formula:

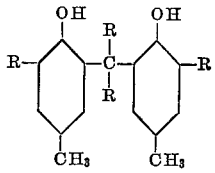

wherein each R is a radical independently selected from the group consisting of hydrogen and hydrocarbon radicals, said antioxidant being present in a stabilizing amount, and (3) a diethanolamine having the formula:

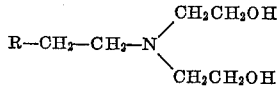

wherein R is a radical selected from the group consisting of (a) aliphatic hydrocarbon radicals having about 8–18 carbon atoms and (b) radicals of the formula:

wherein R' is an aliphatic hydrocarbon radical having about 7–17 carbon atoms, said diethanolamine being compatible with said poly-α-olefin and present in a color stabilizing amount.

2. A plastic composition according to claim 1 wherein said bisphenol antioxidant is present in a quantity of about 0.1 to 1 weight percent and said diethanolamine is present in a quantity of about 0.01 to 0.5 weight percent.

3. A plastic composition according to claim 1 wherein the poly-α-olefin polymeric material is normally solid polyethylene.

4. A plastic composition according to claim 3 wherein said diethanolamine is N,N - bis(2-hydroxyethyl)-N-dodecylamine.

5. A plastic composition according to claim 3 wherein said diethanolamine is triethanolamine monolaurate.

6. A plastic composition according to claim 1 wherein the poly-α-olefin polymeric material is normally solid polypropylene.

7. A plastic composition according to claim 6 wherein the diethanolamine is N,N-bis(2-hydroxyethyl)-N-octylamine.

8. A plastic composition according to claim 6 wherein the diethanolamine is N,N-bis(2-hydroxyethyl)-N-octadecylamine.

9. A plastic composition according to claim 6 wherein said diethanolamine is triethanolamine monostearate.

10. A plastic composition as in claim 1 wherein the bisphenol antioxidant is 2,2'-methylene-bis [4-methyl-6-(1-methylcyclohexyl)-phenol].

11. A plastic composition according to claim 10 wherein said diethanolamine is triethanolamine monolaurate.

12. A plastic composition according to claim 10 wherein the diethanolamine is N,N-bis(2-hydroxyethyl)-N-dodecylamine.

References Cited

UNITED STATES PATENTS

| 2,476,554 | 7/1949 | Lincoln | 260–644 |
| 2,829,121 | 4/1958 | Leeper | 260–45.9 |
| 2,985,617 | 5/1961 | Salyer et al. | 260—45.9 |
| 3,013,997 | 12/1961 | Coler et al. | 260–45.9 |

DONALD E. CZAJA, *Primary Examiner.*

LEON J. BERCOVITZ, *Examiner.*

H. E. TAYLOR, *Assistant Examiner.*